Patented June 19, 1945

2,378,447

UNITED STATES PATENT OFFICE 2,378,447

PLASTICIZED COMPOSITION

Frank J. Soday, Swarthmore, Pa., assignor to The United Gas Improvement Company, a corporation of Pennsylvania No Drawing. Application July 7, 1942,
Serial No. 450,085

17 Claims. (Cl. 106—183)

This invention relates to new compositions of matter and to methods for their preparation.

More specifically, this invention pertains to the use of one or more esters of alkyl phenylethyl alcohols, either alone or in combination with other plasticizing agents, as plasticizing agents for resins and plastics.

An object of the present invention is the provision of new compositions of matter comprising mixtures or blends of one or more esters of alkyl phenylethyl alcohols with one or more resins or plastics. Another object of the invention is the provision of organic compounds comprising fluids which are essentially colorless and which are suitable for use alone or in combination with other substances as plasticizers in the formulation of lacquers, particularly those derived from one or more cellulosic plastics. A further object of the invention is the provision of new molding compositions comprising one or more esters of alkyl phenylethyl alcohols in combination with one or more resins or plastics.

Other objects and advantages of the invention will be apparent to those skilled in the art from the following description.

Alkyl phenylethyl alcohols

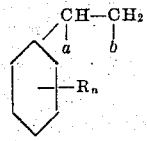

in which one of the group consisting of $a$ and $b$ is an hydroxyl group, the remaining group being hydrogen, R is an alkyl group, and $n$ denotes that from one to five alkyl groups may be present in the molecule, may be esterified with acids to give esters which are unusually stable, light in color, and possess exceptionally desirable odors.

I have discovered that certain esters of alkyl phenylethyl alcohols are unusually desirable plasticizing agents for a wide variety of resinous and plastic materials.

Acids which may be reacted with alcohols of the type described include aliphatic monobasic acids, such as formic, acetic, propionic, butyric, valeric, caproic, oenanthic, caprylic, pelargonic, capric, and similar acids having a higher number of carbon atoms; unsaturated acids, such as acrylic acid, crotonic acid, isocrotonic acid, methacrylic acid, vinylacetic acid, and the like; halogenated fatty acids, such as chloroformic acid, monochloroacetic acid, dichloroacetic acid, alpha-chloropropionic acid, and the like; hydroxy acids, such as glycollic acid, lactic acid, alpha-hydroxybutyric acid, and the like; amino acids, such as glycine, alanine, valine, leucine, and the like; and aryl-substituted aliphatic acids, such as phenylacetic acid, hydrocinnamic acid, phenyl propionic acid, cinnamic acid, and the like.

Such esters may be regarded as having the following structural formula

in which one of the group consisting of $a$ and $b$ is an —OOC—X group, in which X is hydrogen, alkyl, alkenyl, substituted alkyl, substituted alkenyl, aryl-alkyl, substituted aryl-alkyl, the

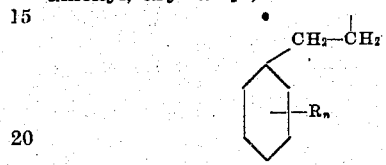

group, or the

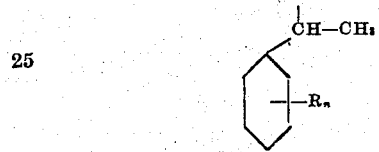

group, the remaining of said group $a$ and $b$ being hydrogen, R is an alkyl group, and $n$ denotes that from one to five alkyl groups may be present in the molecule.

Aliphatic monobasic acid esters of tolylethyl alcohols,

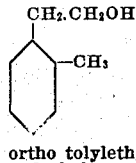 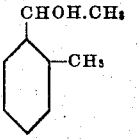

Beta ortho tolylethyl alcohol  Alpha ortho tolylethyl alcohol

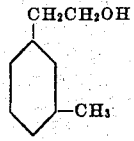 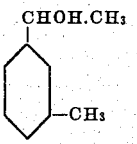

Beta meta tolylethyl alcohol  Alpha meta tolylethyl alcohol and

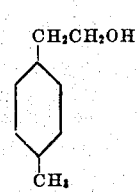 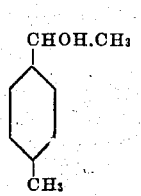

Beta para tolylethyl alcohol  Alpha para tolylethyl alcohol are particularly desirable plasticizing agents for resinous and plastic materials.

The preparation of alpha tolylethyl alcohol is disclosed and claimed in my copending application, Serial No. 290,501, filed August 16, 1939, now Patent 2,293,774, dated August 25, 1942.

The use of alkyl esters of such alcohols as plasticizing agents has been found to give unusually good results in practically all cases. The acetic, propionic, butyric, and valeric acid esters of tolylethyl alcohols are particularly desirable plasticizing agents for a wide variety of resinous and/or plastic materials, such as the cellulosic plastics.

The preparation of the acetic and butyric acid esters of tolylethyl alcohols are disclosed and claimed in my copending applications, Serial Nos. 290,502, filed August 16, 1939, now Patent 2,293,775, dated August 25, 1942, and 313,342, filed January 11, 1940, now Patent 2,316,912, dated April 20, 1943.

Such esters may be prepared by the reaction of the desired tolylethyl alcohol, or mixtures of tolylethyl alcohols, or derivatives of tolylethyl alcohols containing an atom or group capable of being replaced with an ester group corresponding to the desired acid or mixture of acids, with the desired acid or anhydride, or salts or derivatives thereof.

The preparation of such esters may be illustrated by the preparation of the valeric acid esters of tolylethyl alcohols.

Valeric acid occurs in four isomeric forms, as follows.

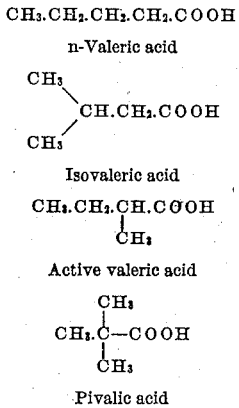

$CH_3.CH_2.CH_2.CH_2.COOH$ n-Valeric acid

Isovaleric acid $CH_3.CH_2.CH.COOH$
         |
        $CH_3$

Active valeric acid $$CH_3.\underset{\underset{CH_3}{|}}{\overset{\overset{CH_3}{|}}{C}}-COOH$$

Pivalic acid

The conversion of tolylethyl derivatives to tolylethyl esters of valeric acids may be carried out in any suitable manner, and with any suitable esterification apparatus.

Any suitable esterification reagent, such as a valeric acid, its anhydride, its salt of mixtures thereof, may be employed as desired.

For example, valeric acid or acid halides thereof may be employed for the conversion of tolylethyl alcohols or metallic derivatives thereof to valerates, and salts of valeric acid may be used for the conversion of tolylethyl halides to valerates.

Illustrative of the salts of valeric acid which may be employed as esterification reagents may be mentioned sodium valerate, potassium valerate, calcium valerate, iron valerate, lead valerate and other salts. These salts may be the normal valerates, or the isomeric valerates, or any desired mixture thereof.

The esterification reaction may be carried out in the presence of a solvent, such as for example, benzene, if desired.

Any suitable reaction temperature may be employed, such as for example, the boiling point of the solution.

The esterification reaction may be carried out at atmospheric, subatmospheric, or superatmospheric pressures, as desired.

Suitable esterification catalysts, such as, for example, sulfuric acid, phosphoric acid or anhydrous hydrogen chloride, may be advantageously employed in certain of the reactions, particularly in the conversion of tolylethyl alcohols to esters of valeric acids.

The use of a system whereby any water formed by the esterification reaction can be continuously removed from the system will, in general, be found advantageous from the standpoint of the yield of ester secured, as well as from the standpoint of the considerable reduction in time necessary to complete the reaction.

One suitable method for effecting the esterification processes of the present invention comprises refluxing the derivatives with esterification reagents for a period of several hours.

For example, salts of valeric acids may be refluxed with tolylethyl halides to produce the corresponding tolylethyl esters. This reaction may, if desired, be effected in the presence of the corresponding valeric acid.

The tolylethyl esters thus produced may be suitably separated from the halogen salts in the reaction mixture, for example, by filtration.

If a valeric acid has been employed in the esterification reaction, it may be removed such as by distillation under reduced pressure. Any unremoved acid may then be neutralized such as with an alkaline solution.

The tolylethyl esters obtained by the processes herein described may be isolated and purified in any desired manner.

For example, the reaction mixture may, if desired, be repeatedly extracted with any suitable solvent, such as ether or benzene, to increase the yield and purity of the tolylethyl esters therein.

The extracts may then be combined and dried over a drying agent such as, for example, anhydrous sodium sulfate, after which the extraction solvent employed may be removed by distillation at atmospheric pressure. The residue may then be fractionally distilled in vacuo to obtain a purified tolylethyl ester of valeric acid.

Mixtures of alpha and beta tolylethyl derivatives, in any proportion, may be employed in the preparation of mixtures of alpha and beta tolylethyl esters of valeric acids.

Such mixtures of the alpha and beta forms of para tolylethyl esters of valeric acids may be desired in order to obtain a product possessing a desired boiling range, or desired volatility characteristics, or other desired properties.

For example, a mixture containing the desired proportion of each of the isomeric forms of tolylethyl halides may be reacted with a salt of valeric acid to obtain a tolylethyl ester fraction containing the desired proportion of the isomeric forms of tolylethyl esters of the acid. Mixtures containing the desired proportion of alpha and beta tolylethyl halides suitable for use in my process may be obtained, for example, by adding a hydrogen halide to methyl styrene under the proper conditions to give the desired mixture of isomeric tolylethyl halides.

Similarly, a mixture of the isomeric forms of other tolylethyl derivatives, such as for example the tolylethyl alcohols, in the desired proportions, may be esterified to obtain a tolylethyl ester fraction containing the desired proportion of the isomeric forms of tolylethyl esters of valeric acid. Also a mixture of valeric acids or anhydrides, or derivatives thereof, may be employed in the foregoing processes.

When mixtures of isomeric forms of tolylethyl esters of valeric acid are obtained, they may if desired be separated into fractions containing the individual isomers by any suitable method, such as for instance by fractionation.

As illustrative of the methods for preparing various tolylethyl esters of valeric acids, the following examples are given:

Example 1

A 108 gram (0.7 mole) portion of alpha, para-tolylethyl chloride:

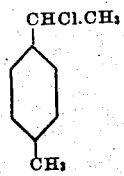

was added with stirring to a mixture of 127 grams (0.91 mole) of freshly prepared potassium n-valerate in 100 grams of n-valeric acid, the addition being carried out in a 1-liter flask fitted with a reflux condenser. The mixture was heated to 140° C. by means of an oil-bath and maintained at this temperature with good stirring for a period of five hours. It was allowed to cool and then treated with 10% sodium bicarbonate solution to neutralize the unchanged valeric acid present. The neutral mixture was then extracted with ether and dried over anhydrous sodium sulphate.

After the ether had been removed by heating on a hot water bath, the ester was distilled in vacuo, giving 110 grams of alpha, para-tolylethyl n-valerate.

This compound had the following structural formula and physical properties:

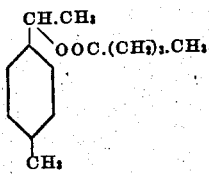

Boiling range=126–127° at 6 mm. Hg absolute
Density ($d$ 20/4) =0.9697
Refractive index ($n$ 20/d) =1.48805
The yield was 71.4% of theoretical.

The compound was a colorless, somewhat viscous liquid with a very pleasant odor.

Example 2

A solution of potassium n-valerate in n-valeric acid was made by stirring 210 grams (1.5 mols) of the fused salt into 250 grams of the anhydrous acid heated to 100° C. When a clear syrupy solution was obtained, 199 grams (1 mol) of beta, para-tolylethyl bromide:

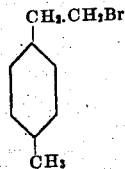

was added slowly through the reflux condenser and the temperature was raised gradually to 170°. This temperature was maintained for a period of 13 hours, during which time a fine precipitate of potassium bromide separated from the reaction mixture.

The mixture was cooled and filtered by suction to remove the potassium bromide and excess potassium valerate, and the clear filtrate was distilled under reduced pressure to remove the major portion of the valeric acid which came over at a temperature of 50–60° at 4 mm. pressure absolute. The potassium bromide and excess potassium valerate were dissolved in cold water and extracted twice with ether to recover the small amount of absorbed ester. This extract was combined with the crude ester and treated with 10% sodium bicarbonate solution to neutralize the residual acid. It was then extracted with ether, dried with anhydrous sodium sulphate, and distilled.

Distillation under reduced pressure gave 172 grams of beta, para-tolylethyl n-valerate:

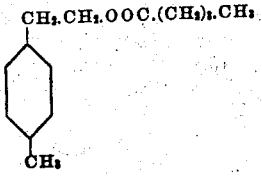

This compound had the following physical properties:

Boiling range=113–116° at 4 mm. Hg absolute
Density ($d$ 20/4) =0.9720
Refractive index ($n$ 20/d) =1.48855

This represented a yield conversion of 78.2%, based on the amount of beta, para-tolylethyl bromide used in the esterification.

The ester was obtained as a colorless, somewhat viscous liquid with an agreeable odor.

Example 3

A solution of potassium isovalerate in isovaleric acid was made by stirring 210 grams (1.5 mols) of freshly fused potassium isovaleric into 300 grams of the anhydrous acid at a temperature of 90° C. When a clear syrupy solution was obtained, 155 grams (1 mol) of alpha para-tolylethyl chloride:

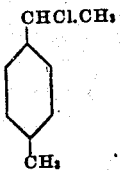

was added slowly through the reflux condenser, and the temperature was raised gradually to 140° C. The temperature was kept at 140–145° for five hours with vigorous stirring, during which time a fine precipitate of potassium chloride separated out as a by-product of the reaction. The mixture was cooled and filtered by suction to remove the potassium chloride and excess potassium isovalerate, and the clear filtrate was distilled under reduced pressure to remove most of the isovaleric acid. The higher boiling liquid containing the ester was treated in the cold with 10% sodium bicarbonate solution to neutralize the residual acid. It was then extracted with ether, dried and distilled.

Distillation under reduced pressure gave 166 grams of alpha, para-tolylethyl isovalerate:

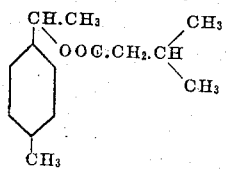

This compound has the following physical properties:

Boiling range=127–132° at 7 mm. Hg absolute
Density ($d\ 20/4$)=0.9642
Refractive index ($n\ 20/d$)=1.48532
The yield was 75.5% based on the weight of alpha, para-tolylethyl chloride used.

This product was a colorless, somewhat viscous liquid with an agreeable ester odor.

Example 4

A 210 gram portion (1.5 mols) of potassium isovalerate was added with stirring to 250 grams of isovaleric acid and heated to 100° C. until all the salt was dissolved. To this clear, syrupy solution was added dropwise, with continued stirring, 200 grams (1 mol) of beta, para-tolylethyl bromide:

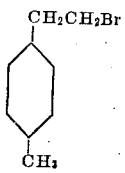

in 50 minutes after which the temperature was raised to 165°. The temperature was kept at 163–167°, producing mild refluxing of the acid, for a period of 14 hours. The reaction mixture was then cooled and filtered to remove the potassium bromide and excess potassium isovalerate, and this solid matter was dissolved in water and extracted with ether to recover any absorbed ester. The clear filtrate was distilled to remove most of the isovaleric acid which came over at 49–51° at 3 mm. Hg absolute. The crude ester, combined with the ether extract, was treated with 10% sodium bicarbonate solution to neutralize the residual acid. It was then extracted with ether, dried with anhydrous sodium sulphate and distilled.

Distillation under reduced pressure gave 156 grams of beta, para-tolylethyl isovalerate:

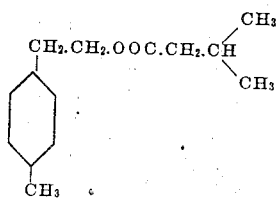

This compound had the following physical properties:

Boiling range=99–104.5° at 1 mm. Hg absolute
Density ($d20/4$)=0.9645
Refractive index ($n20/d$)=1.48527
This weight of product represented a yield of 73.4%, based on the weight of beta, para-tolylethyl bromide used in the esterification.

The ester was obtained as a colorless, somewhat viscous liquid with a very sweet odor.

It will be understood of course, that tolylethyl esters of valeric acids may be prepared from pure methyl styrene or hydrocarbon fractions such as light oil fractions containing methyl styrene by processes which may be conducted on a continual, continuous, semi-continuous, or batch basis. For example, such a process may comprise first converting the methyl styrene into a tolylethyl derivative containing a substituent capable of being replaced with an ester group corresponding to the desired valeric acid, and thereafter effecting esterification of said derivative.

For example, a tolylethyl halide or a mixture of tolylethyl halides may be prepared from a light oil methyl styrene fraction obtained by the distillation of light oil from oil gas and containing meta, para and ortho methyl styrenes and these tolylethyl halides may then be esterified to form the desired tolylethyl esters of valeric acid.

Likewise, a mixture of tolylethyl alcohols may be prepared from such a methyl styrene fraction, after which the tolylethyl alcohols may be converted into tolylethyl esters of valeric acid by esterification.

The aliphatic monobasic acid esters of alkyl phenylethyl alcohols are, in general, practically colorless fluids possessing very pleasant odors.

As pointed out previously, these esters are excellent plasticizers for resinous and plastic materials, including (1) cellulosic derivative plastics, such as cellulose esters and ethers, for example, cellulose acetate, cellulose nitrate, ethyl cellulose, benzyl cellulose, cellulose acetopropionate, cellulose acetobutyrate, and the like; (2) vinyl plastics, such as plastics derived from vinyl esters, for example, vinyl chloride, vinyl acetate, vinyl chloride-vinyl acetate mixtures, vinyl chloroacetate, vinyl propionate, and the like, and polyvinyl acetal, polyvinyl butyral, and similar plastics; (3) vinylidene plastics, such as polymerized vinylidene esters and derivatives, for example vinylidene chloride, vinylidene acetate, and the like; (4) styrene and substituted styrene polymers, such as polystyrene, polymethyl styrene, polystyrene-polymethyl styrene copolymers, and the like; (5) methacrylic plastics, such as polymers derived from methacrylic acid, esters and/or derivatives of methacrylic acid, for example methyl methacrylate, ethyl methacrylate, and the like, methacrylic nitrile, and similar compounds; (6) acrylic plastics, such as polymers derived from acrylic acid and/or esters or derivatives thereof, for example, methyl acrylate, ethyl acrylate, acrylic nitrile, and similar materials; (7) hydrocarbon resins such as isobutylene polymers, (8) miscellaneous plastics, such as polyvinyl alcohol, alkyd resins, ester gum, rosin ester, polyamide-polybasic acid plastic masses, and the like; and (9) natural resins, such as rosin, copal, kauri, dammar, pontiniak, and elemi.

Copolymers prepared by the copolymerization of two or more of the monomeric compounds listed or indicated in the preceding paragraph also may be plasticized by esters of the type disclosed herein.

The properties of aliphatic monobasic acid esters of alkyl phenyl alcohols, and particularly the alkyl esters of tolylethyl alcohols, which render them particularly desirable for use as plasticizing agents for resinous and plastic materials are (1) their unusually good solubility characteristics, rendering them compatible with a wide variety of resins and plastics, (2) their chemically inert nature, resulting in the production of very stable compositions, (3) their relatively high boiling point or ranges, retarding or preventing blushing, bleeding, blooming, and the like, and insuring against premature embrittlement due to loss of solvent, (4) their colorless and color-stable properties, enabling permanent light colored or colorless compositions to be formed at will, (5) the ease with which they may be incorporated in plastic compositions, and (6) their low viscosity characteristics.

Any desired quantity of esters of the type disclosed herein may be incorporated in such resinous or plastic compositions, or mixtures thereof, due care being taken not to exceed the compatibility limit of the desired ester of alkyl phenyl alcohol, or mixtures of such esters, if a clear plastic and/or coating composition or film is desired. In certain cases in which a translucent and/or opaque effect is desired, the compatibility limit of the ester, or mixture of esters, in the plastic, or mixture of plastics, may be exceeded with this end in view.

For most purposes, I find that 50%, or less, of an ester, or mixture of esters, of the type described herein is sufficient to impart the desired degree of plasticity to the resin and/or plastic, although this quantity may be exceeded in certain cases. Excellent results may be secured in many cases in which 30%, or even less, of the plasticizing agent is employed.

Esters of the type described herein also may be used in conjunction with other plasticizing agents, such as esters of phthalic acid, tetrahydrophthalic acid, 3-methyl-Δ4-tetrahydrophthalic acid, 4-methyl-Δ4-tetrahydrophthalic acid, 3,6-endomethylene-Δ4-tetrahydrophthalic acid, maleic acid, and the like; esters of sebacic acid such as dicapryl sebacate; esters of abietic acid, and rosin acid, as well as hydrogenated esters thereof; phosphoric acid esters, such as tricresyl phosphate; chlorinated diphenyls; and the like, in plasticizing resinous and/or plastic materials. In all such cases, I prefer to employ plasticizing compositions in which esters of the type described herein are the preponderating constituent, or constituents, present.

Other ingredients, including solvents, fillers, pigments, dyes, driers, and the like also may be incorporated in resin-plasticizer compositions of the type described, if desired.

Resin and/or plastic compositions of the type described may be used for many purposes, such as the preparation of molding powders for extruding rods, tubes, sheets, films, and the like; for the preparation of coating and/or impregnating compositions; for the preparation of aqueous emulsions; and the like.

Plasticizing agents of the type described herein may be incorporated in monomeric resin-forming materials prior to, or during, their polymerization or conversion to the resinous state, as they are completely inert in nature and do not affect the polymerization in any way. This is of very considerable practical importance as it permits the formulation of plasticized casting compositions, and/or insures a uniform distribution of the plasticizing agent throughout the resulting plastic.

Casting compositions may, of course, contain one or more monomeric polymerizable compounds, and such compound or mixture of compounds may be polymerized to any desired extent short of complete polymerization prior to casting.

Plasticizing agents of the type described herein may be incorporated after polymerization or conversion to the resinous state, if desired.

The use of aliphatic monobasic acid esters of alkyl phenylethyl alcohols as plasticizing agents is illustrated by the following examples.

*Example 5*

A mixture of 0.5 gram of alpha tolylethyl acetate and 9.5 grams of monomeric styrene was placed in an 18 x 150 mm. glass test tube, after which an aluminum insert comprising a rod ¼" in diameter and 4" long also was placed in the tube. The air in the test tube was displaced with nitrogen and the tube loosely capped with a piece of aluminum foil.

The mixture was heated for a period of 72 hours at a temperature of 120° C., then for 48 hours at a temperature of 140° C., and finally for 12 hours at a temperature of 65° C. Upon removing the test tube from the polymerized sample, a clear polystyrene casting containing an aluminum insert was obtained.

*Example 6*

A mixture of 0.5 gram of beta tolylethyl isovalerate and 9.5 grams of monomeric styrene was heated in the presence of an aluminum insert in a manner similar to that described in Example 5, with the exception that the heating period at 65° C. was extended to 36 hours.

A clear, colorless polystyrene casting containing an aluminum insert was obtained.

*Example 7*

A mixture of 0.5 gram of beta tolylethyl isobutyrate and 9.5 grams of monomeric styrene was heated in the presence of an aluminum insert according to the method outlined in Example 6. A clear, practically colorless polystyrene casting enclosing an aluminum insert was obtained.

*Example 8*

A mixture of 0.5 gram of alpha tolylethyl propionate and 9.5 grams of monomeric styrene was placed in a test tube and sealed in an atmosphere of nitrogen. The tube then was heated for a period of 10 days at a temperature of 100° C., after which the tube was removed from the polymerized styrene. A clear, colorless, plasticized polystyrene casting possessing excellent mechanical properties was obtained.

*Example 9*

A mixture of 0.5 gram of alpha tolylethyl n-butyrate and 9.5 grams of monomeric styrene was placed in a test tube and sealed in an atmosphere of nitrogen. The test tube then was heated for a period of 8 days at 100° C., followed by heating for an additional period of 2 days at a temperature of 145° C. After removing the test tube from the polymerized material, a clear, colorless plasticized polystyrene casting was obtained.

*Example 10*

A mixture of 0.5 gram of beta tolylethyl n-valerate and 9.5 grams of monomeric styrene was heated in an atmosphere of nitrogen for a period of 4 days at a temperature of 110° C., followed by heating for an additional period of one day at a temperature of 140° C. A clear, tough, plasticized polystyrene casting was obtained.

*Example 11*

A mixture of 0.5 gram of beta tolylethyl isovalerate and 9.5 grams of monomeric methyl styrene was heated in an atmosphere of nitrogen for a period of 8 days at a temperature of 100° C., followed by heating for an additional period of 2 days at a temperature of 145° C. A clear, transparent polymethylstyrene casting possessing excellent mechanical properties was obtained.

Example 12

A mixture of 0.5 gram of alpha tolylethyl n-butyrate and 9.5 grams of monomeric methyl methacrylate was heated in the presence of a trace of benzoyl peroxide for a period of 4 days at a temperature of 100° C., followed by heating for 1 day at a temperature of 145° C. A clear, tough colorless, transparent casting was obtained.

Example 13

A nitrocellulose lacquer having the following composition was prepared

| | Parts |
|---|---|
| Ester gum | 5 |
| Alpha tolylethyl acetate | 5 |
| One half-second nitrocellulose | 10 |
| Thinner | 40 |

The thinner used had the following composition

| | Parts |
|---|---|
| Pentacetate | 20 |
| Tertiary amyl alcohol | 10 |
| Isopropyl acetate | 13 |
| Absolute ethyl alcohol | 3 |
| Toluene | 34 |
| Toluol | 20 |

The lacquer was clear and light amber in color. A portion of it was flowed on the surface of a tin panel and permitted to dry for a period of 48 hours. The coating film obtained was clear and possessed good elastic properties.

Example 14

A lacquer similar to that described in Example 13 was prepared with the exception that beta tolylethyl isovalerate was used as a plasticizing agent in place of alpha tolylethyl acetate. The lacquer was clear and was light amber in color. It was flowed on the surface of a reduced iron panel and baked for one hour at a temperature of 100° C. A clear, transparent, adherent film was obtained, which was not removed when the coated panel was bent sharply through an angle of 180° C.

Example 15

A lacquer similar to that described in Example 13 was prepared, with the exception that beta tolylethyl isobutyrate was substituted for alpha tolylethyl acetate in the formula.

The clear lacquer was applied to the surface of a steel panel and permitted to dry for a period of 48 hours. A clear, adherent, distensible film was obtained.

Example 16

A lacquer similar to that described in Example 13 was prepared, alpha tolylethyl propionate being used as the plasticizing agent in place of alpha tolylethyl acetate.

The lacquer was applied to the surface of a tin panel and permitted to dry for a period of 48 hours. A clear, adherent coating film which could not be removed readily from the surface of the panel was obtained.

Example 17

A nitrocellulose lacquer was prepared according to the following formula.

| | Parts |
|---|---|
| Nitrocellulose | 5 |
| Rosin ester | 2½ |
| Alpha toylethyl n-butyrate | 2½ |
| Thinner | 40 |

The thinner had the following composition

| | Parts |
|---|---|
| Propyl acetate | 15 |
| Amyl acetate | 18 |
| Mixed amyl alcohols | 10 |
| Ethyl alcohol | 4 |
| Toluene | 33 |
| Petroleum naphtha | 20 |

The lacquer was clear and had a very slight amber color. It was flowed on the surface of a freshly cleaned tin panel and permitted to dry for a period of 48 hours. A clear, adherent coating was obtained.

Example 18

A lacquer similar to that described in Example 17 was prepared, beta tolylethyl n-valerate being used as a plasticizing agent in place of alpha tolylethyl n-butyrate.

The lacquer was flowed on the surface of a freshly cleaned magnesium panel and permitted to dry for a period of 48 hours. The coating obtained was clear and adhered well to the metallic surface.

Example 19

An ethyl cellulose lacquer was prepared according to the following formula.

| | Parts |
|---|---|
| Ethyl cellulose | 10 |
| Beta tolylethyl isovalerate | 5 |
| Ester gum | 5 |
| Thinner | 80 |

The used thinner had the following composition.

| | Parts |
|---|---|
| Isopropyl acetate | 15 |
| Absolute ethyl alcohol | 3 |
| Amyl acetate | 18 |
| Tertiary amyl alcohol | 10 |
| Toluene | 40 |
| Toluol | 14 |

The lacquer was clear and had a very light amber color. It was brushed on the surface of a tin panel and permitted to dry for a period of 48 hours. A clear, adherent coating film was obtained.

Example 20

A lacquer similar to that described in Example 19 was prepared, with the exception that beta tolylethyl isobutyrate was used as the plasticizing agent in place of beta tolylethyl isovalerate.

The clear lacquer was applied to the surface of a reduced iron panel and baked for a period of one hour at a temperature of 100° C. The coating was clear and colorless and showed no evidences of cracking when the coated panel was bent sharply through an angle of 180°.

Example 21

A lacquer similar to that described in Example 19, with the exception that alpha tolylethyl propionate was used as the plasticizing agent in place of beta tolylethyl isovalerate was prepared.

The clear coating was applied to the surface of paper stock and permitted to dry for a period of 48 hours. A clear, glossy, lacquer paper was obtained.

Example 22

A lacquer similar to that described in Example 19 was prepared, alpha tolylethyl n-butyrate being used as the plasticizing agent.

The clear lacquer was applied to the surface of a freshly cleaned magnesium panel and permitted to dry for a period of 48 hours. A clear, adherent, coating film was obtained.

*Example 23*

A lacquer having the following composition was prepared.

| | Parts |
|---|---|
| Rosin ester | 5 |
| Low-viscosity ethyl cellulose | 10 |
| Beta tolylethyl n-valerate | 5 |
| Thinner | 80 |

The thinner used had the following composition.

| | Parts |
|---|---|
| Mixed amyl acetates | 20 |
| Mixed amyl alcohols | 10 |
| n-Propyl acetate | 15 |
| Ethyl alcohol | 3 |
| Toluene | 34 |
| Petroleum thinner | 18 |

The clear lacquer was applied to the surface of a tin panel and baked for a period of one hour at 100° C. A clear, adherent coating film, which showed no signs of cracking or silking when bent sharply through an angle of 180°, was obtained.

*Example 24*

A lacquer similar to that described in Example 23 with the exception that alpha tolylethyl acetate was used as the plasticizing agent, was prepared. The lacquer was clear and light amber in color.

It was flowed on the surface of a reduced iron panel, after which it was permitted to dry for a period of 48 hours at room temperature. A clear, extensible, adherent coating film was obtained.

*Example 25*

A cellulose acetate lacquer was prepared by mixing 7 parts of the following base formula.

| | Parts |
|---|---|
| Alpha tolylethyl acetate | 35 |
| Cellulose acetate | 65 | with 93 parts of a thinner having the following composition.

| | Parts |
|---|---|
| Acetone | 50 |
| Cellosolve | 20 |
| Toluene | 15 |
| Pentacetate | 15 |

The lacquer obtained was fairly clear and quite colorless. It was flowed out on the surface of a tin panel and permitted to dry for a period of 48 hours. A fairly adherent coating film was obtained.

*Example 26*

A mixture of 30 parts of an alkyl ester of tolylethyl alcohol and 70 parts of polyvinylchloride is thoroughly blended on a hot roll. After sheeting, a pliable composition having good mechanical properties is obtained.

In certain cases, particularly in lacquers, it may be advantageous to have an alcohol, such as an alkyl phenyl ethyl alcohol or other alcohol, present in order to neutralize any acid which may be formed through hydrolysis of the ester or esters of alkyl phenyl ethyl alcohols.

While the use of specific esters of alkyl phenylethyl alcohols, and particularly of tolylethyl alcohols, as plasticizing agents have been specifically described, it is to be understood that this is by way of illustration. Therefore, changes, omissions, additions, substitutions, and/or modifications may be made within the scope of the claims without departing from the spirit of the invention.

I claim:

1. A plasticized composition comprising a plasticizable organic substance and as plasticizer therefor an aliphatic monobasic acid ester of an alkyl phenylethyl alcohol.

2. As a new composition of matter, a plasticized organic substance in which the plasticizer is an aliphatic monobasic acid ester of tolylethyl alcohol.

3. As a new composition of matter, a plasticizable organic substance plasticized up to 50% of its weight with tolylethyl acetate.

4. A plasticized composition comprising a plasticizable organic substance and as plasticizer therefor up to 50% of its weight of a tolylethyl butyrate.

5. A plasticized composition comprising a plasticizable organic substance and as plasticizer therefor up to 50% of its weight of a tolylethyl valerate.

6. As a new composition of matter, a synthetic cellulosic plastic plasticized up to 50% of its weight by means of an aliphatic monobasic acid ester of tolylethyl alcohol.

7. As a new composition of matter, a vinyl resin plasticized by means of an aliphatic monobasic acid ester of tolylethyl alcohol.

8. As a new composition of matter, a hydrocarbon resin plasticized up to 50% of its weight by means of an aliphatic monobasic acid ester of tolylethyl alcohol.

9. Polystyrene plasticized up to 30% of its weight by means of an aliphatic monobasic acid ester of tolylethyl alcohol.

10. A lacquer comprising a solvent and a plasticized cellulosic plastic in which the plasticizer is an aliphatic monobasic acid ester of tolylethyl alcohol.

11. A molding composition comprising a finely divided plasticized organic substance in which the plasticizer is an aliphatic monobasic acid ester of an alkyl phenylethyl alcohol.

12. A molded object comprising a molded plasticized organic substance in which the plasticizer is an aliphatic monobasic acid ester of an alkyl phenylethyl alcohol.

13. An extruded object comprising an extruded plasticized synthetic organic substance in which the plasticizer is an aliphatic monobasic acid ester of an alkyl phenylethyl alcohol.

14. Plasticized cellulosic plastic in which the plasticizing agent is a tolylethyl acetate.

15. A plasticized composition comprising an organic synthetic plastic and as plasticizing agent therefor an aliphatic monobasic acid ester of an alkyl phenylethyl alcohol.

16. A plasticized composition comprising a cellulosic plastic and as plasticizer therefor an aliphatic monobasic acid ester of an alkyl phenylethyl alcohol.

17. A molding compound comprising a finely divided synthetic cellulosic plastic plasticized by means of an aliphatic monobasic acid ester of tolylethyl alcohol.

FRANK J. SODAY.